(12) United States Patent
Radamis et al.

(10) Patent No.: US 6,609,052 B2
(45) Date of Patent: Aug. 19, 2003

(54) TORQUE SENSOR BACKUP IN A STEER-BY-WIRE SYSTEM

(75) Inventors: Maged Radamis, Canton, MI (US); Bing Zheng, Dublin, OH (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/810,277

(22) Filed: Mar. 16, 2001

(65) Prior Publication Data

US 2002/0161499 A1 Oct. 31, 2002

(51) Int. Cl.$^7$ .............................. G06F 19/00; B62D 5/00
(52) U.S. Cl. .............................. 701/41; 701/42; 180/402
(58) Field of Search .............................. 701/41, 42, 43; 180/402, 422, 446, 405, 415, 443, 249

(56) References Cited

U.S. PATENT DOCUMENTS

| | | | | |
|---|---|---|---|---|
| 4,669,569 A | * | 6/1987 | Suzuki et al. ................ 180/249 |
| 5,347,458 A | * | 9/1994 | Serizawa et al. ...... 364/424.05 |
| 5,668,722 A | | 9/1997 | Kaufmann et al. ............ 701/41 |
| 5,704,446 A | | 1/1998 | Chandy et al. ............. 180/446 |
| 5,765,116 A | * | 6/1998 | Wilson-Jones et al. ....... 701/41 |
| 5,845,222 A | | 12/1998 | Yamamoto et al. ........... 701/41 |
| 5,907,277 A | * | 5/1999 | Tokunaga .................... 340/441 |
| 5,996,724 A | | 12/1999 | Shimizu et al. ............. 180/446 |
| 6,053,270 A | * | 4/2000 | Nishikawa et al. ......... 180/168 |
| 6,097,286 A | * | 8/2000 | Discenzo .................... 340/465 |
| 6,098,296 A | | 8/2000 | Perisho, Jr. et al. .......... 33/203 |
| 6,138,788 A | | 10/2000 | Bohner et al. ............. 180/405 |
| 6,176,341 B1 | | 1/2001 | Ansari ........................ 180/402 |
| 6,208,923 B1 | * | 3/2001 | Hommel ...................... 701/42 |
| 6,219,604 B1 | * | 4/2001 | Dilger et al. .................. 701/41 |
| 6,279,674 B1 | * | 8/2001 | Lissel et al. ................ 180/402 |
| 6,279,675 B1 | * | 8/2001 | Bohner et al. ............. 180/403 |
| 6,298,940 B1 | * | 10/2001 | Bohner et al. ............. 180/403 |
| 6,389,338 B1 | * | 5/2002 | Chandy et al. ................ 701/29 |

* cited by examiner

*Primary Examiner*—Tan Q. Nguyen
*Assistant Examiner*—Dalena Tran
(74) *Attorney, Agent, or Firm*—Brinks Hofer Gilson & Lione

(57) ABSTRACT

A steer-by-wire system for use in a vehicle includes a driver interface system. The driver interface system includes a steering mechanism for use by an operator of the vehicle. The steer-by-wire system may allow the operator to steer the vehicle during failures within the driver interface system. When a failure is detected, the movement of the steering mechanism is controlled and torque applied by the operator to the steering mechanism is measured. The vehicle is maneuvered by the steer-by-wire system as a function of the torque applied.

29 Claims, 4 Drawing Sheets

TORQUE SENSOR BACKUP IN A STEER-BY-WIRE SYSTEM

BACKGROUND

1. Field of the Invention

This invention relates to steer-by-wire systems, and more particularly to use of a torque sensor to steer a vehicle that includes a steer-by-wire system.

2. Description of the Related Art

Steer-by-wire systems have been used in aircraft applications for many years to provide an electronic connection between a yoke controlled by the pilot and tail flaps, wing flaps and other devices used to maneuver the aircraft. In recent years, steer-by-wire systems have also been applied to land-based vehicles.

Land-based vehicles typically have a steering wheel to control the direction of the vehicle and wheels to allow movement of the vehicle. Steer-by-wire systems in land-based vehicles are characterized by a lack of direct mechanical linkage between the steering wheel and the wheels controlled by the steering wheel. In place of the mechanical linkage, actuators are used to control a turning angle of the wheels. In general, a controller controls the turning angle of the wheels as a function of the angular position of the steering wheel. The angular position of the steering wheel is provided as an electric signal to the controller by a steering sensor.

The steer-by-wire systems of land-based vehicles may also include feedback to the driver of the vehicle. In general, the feedback simulates the conventional mechanical linkage to the wheels by providing stability and "road feel" to the steering wheel. The feedback is provided by a controlled resistive force capable of supplying varying amounts of counter-torque to the steering wheel. The control system for the varying amounts of counter-torque includes a torque sensor to sense the torque applied to the steering wheel by the driver. A steer-by-wire system that includes many of the previously described features is disclosed in U.S. Pat. No. 6,138,788 to Bohner et al.

A general concern in steer-by-wire systems for land-based vehicles is failures within the system that prohibit control of the wheels with the steering wheel. Solutions to this concern may include the use of backup mechanical linkage systems or backup hydraulic systems. Another prior art solution may involve the installation of redundant components in the vehicle for the steer-by-wire system. Upon failure of the primary components, the redundant components may be used.

A known problem with these prior art solutions is additional complexity of the associated vehicle as well as added cost due to additional hardware. In addition, the backup or redundant components require additional space and add weight to the vehicle. Further, the additional components may increase the electrical or mechanical energy supply requirements of the vehicle.

BRIEF SUMMARY

The present invention is defined by the following claims, and nothing in this section should be taken as a limitation on those claims. By way of introduction, the embodiments described below include a method and system for operating a vehicle during a failure in a steer-by-wire system. The method and system allows an operator to steer the vehicle with the steer-by-wire system during the failure using a torque sensor.

The steer-by-wire system comprises a steering actuation system, a controller and a driver interface system. The steering actuation system is directed by the controller, as a function of the driver interface system, to maneuver the vehicle. The driver interface system allows the operator control of the operation of the steer-by-wire system.

The driver interface system includes a steering mechanism, a steering mechanism position sensor and a torque sensor. The steering mechanism may be moved by the operator to steer the vehicle. The position of the steering mechanism, as measured by the steering mechanism position sensor, may be used by the controller to direct the steering actuation system. The torque measured by the torque sensor is indicative of the amount of force applied to the steering mechanism by the operator. A dynamic relationship exists between the applied torque and the resulting position of the steering mechanism.

When a failure occurs in the driver interface system, the controller may restrict or eliminate movement of the steering mechanism by the operator. By controlling movement of the steering mechanism, the controller may direct the steering actuation system as a function of the torque sensor instead of the steering mechanism position sensor. The controller uses the magnitude and direction of torque applied by the operator to the steering mechanism to represent the operator's intent to steer the vehicle. The controller may use the torque to estimate what the position of the steering mechanism would otherwise be and direct the steering actuation system accordingly.

Further aspects and advantages of the invention are discussed below in conjunction with the preferred embodiments.

DETAILED DESCRIPTION OF THE PREFERRED EMBODIMENTS

The steer-by-wire system may operate in a torque steer mode during failure conditions within the steer-by-wire system. During the torque steer mode, the steer-by-wire system may apply a predetermined counter-torque to a steering mechanism and monitor a torque applied to the steering mechanism by an operator of the vehicle. The steer-by-wire system may maneuver the vehicle as a function of the torque and counter-torque applied to the steering mechanism.

Figure 1:
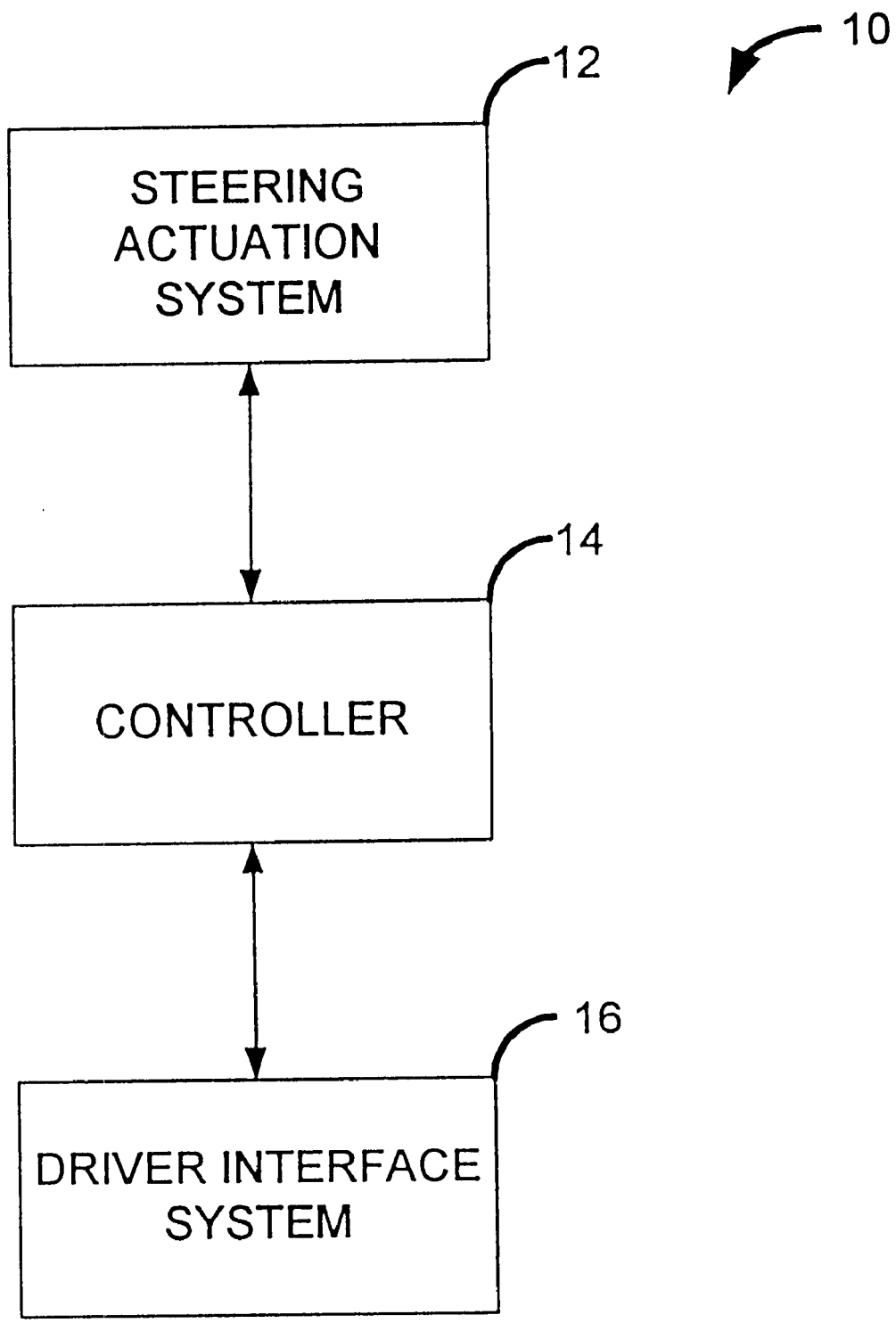
FIG. 1 is a block diagram of one embodiment of a steer-by-wire system.

FIG. 1 illustrates a block diagram of one embodiment of a steer-by-wire system 10. The steer-by-wire system 10 includes steering actuation system (SAS) 12, a controller 14 and a driver interface system (DIS) 16 electrically connected as illustrated. The steer-by-wire system 10 may allow a vehicle (not shown) to be steered with electrical signals generated as a function of the intent of an operator of the vehicle. The vehicle employing the steer-by-wire system 10 may be a boat, an airplane, a jet ski, a snowmobile, a motorcycle, a truck, an automobile or any other device operable to convey the driver.

The steering actuation system 12 may be any system capable of using at least one electrical signal to control the trajectory, or direction, of the vehicle. The steering actuation system 12 may include electronics, sensors and mechanical hardware to control the direction as well as provide feedback and other control parameters to the steer-by-wire system 10. The steering actuation system 12 may provide an interface between the electrical signal and at least one mechanical device, hydraulic device, electrical device or any other mechanism(s) or device(s) used to maneuver the vehicle.

In the presently preferred embodiments, the steering actuation system 12 is operable to maneuver a mechanical device that includes at least one road wheel (not shown). The road wheel may be included on any vehicle that depends on the wheel for movement and maneuverability. The mechanical device may include a mechanism coupled to the road wheel that is capable of adjusting a turning angle of the road wheel. An example of such a mechanical device is the front end of an automobile that may include a rack-and-pinion configuration or any other configuration capable of adjusting the turning angle of one or more road wheels. Movement of the mechanical device to adjust the turning angle is accomplished with one or more actuators. The actuator(s) may be, for example, an electric motor, a hydraulic actuator or any other device capable of adjusting the mechanical device to reposition the road wheel.

The controller 14 is any device operable to control the operation of the steer-by-wire system 10. The controller 14 may, for example, be one or more microprocessors, electronic control units, relay control units or any other device(s) capable of selectively operating the steer-by-wire system 10. In addition, the controller 14 may perform processing or other logic-based operations relating to operation of the vehicle and the steer-by-wire system 10.

During operation, the controller 14 may monitor a plurality of operating parameters of the vehicle. In one embodiment, the operating parameters are provided to the controller 14 in the form of electrical signals. The operating parameters may be, for example, vehicle speed, vehicle direction, operating parameters of the steer-by-wire system 10 and any other parameters pertaining to operation of the vehicle. In addition, the controller 14 may generate electrical signals to control various systems and operations that include the steering actuation system 12 and the driver interface system 16.

The driver interface system 16 may be any system capable of use by an operator of the vehicle to control the steer-by-wire system 10. The driver interface system 16 may include any number of control interface devices for use by the operator, such as, one or more buttons, switches, levers, joy sticks, track balls, voice-activated devices, touch screens, steering wheels or any other device(s) capable of providing operator commands to the steer-by-wire system 10.

Figure 2:
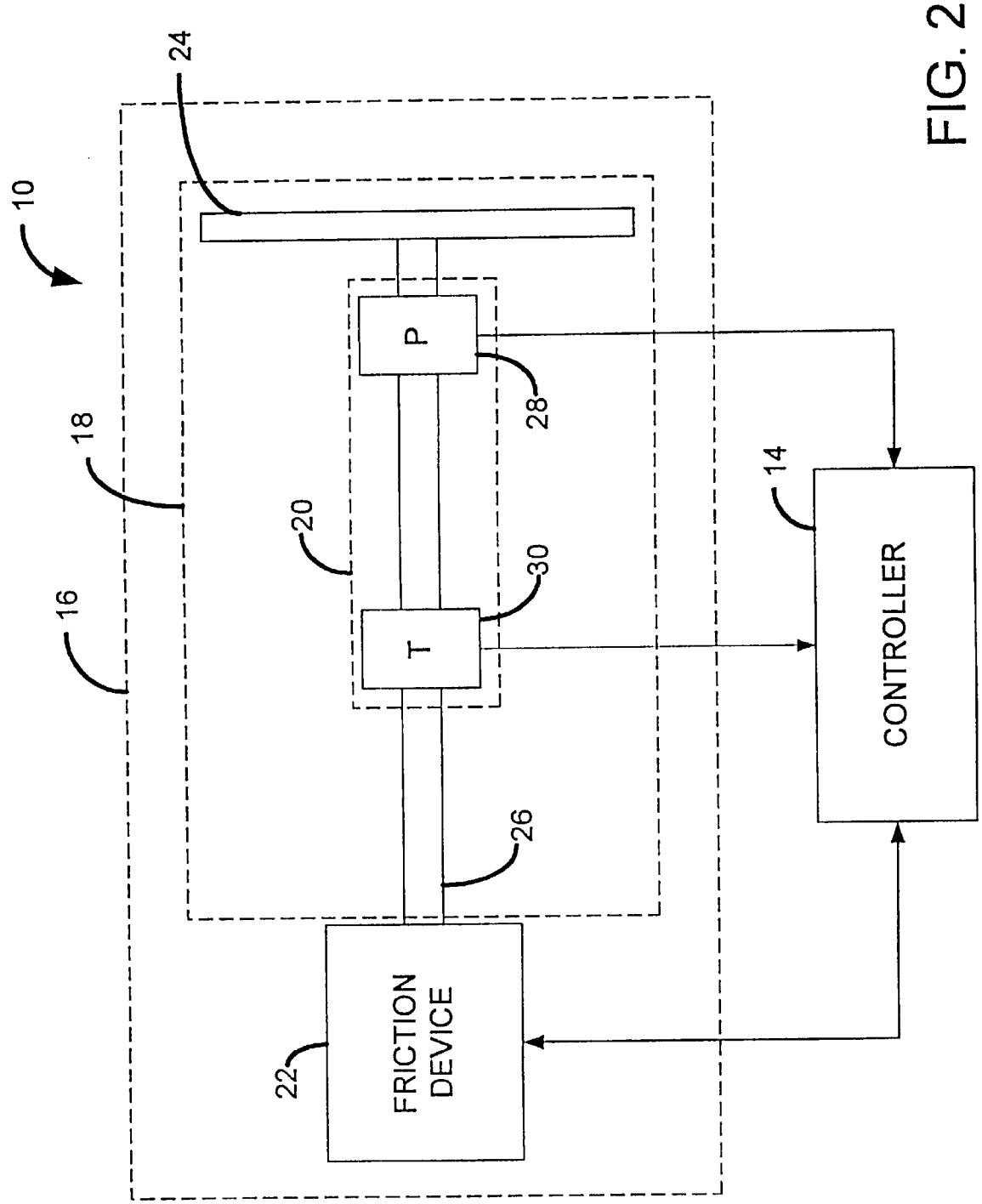
FIG. 2 is an expanded block diagram of a portion of the steer-by-wire system illustrated in FIG. 1.

FIG. 2 is an expanded block diagram of a portion of the steer-by-wire system 10 depicted in FIG. 1. FIG. 2 illustrates the controller 14 and one embodiment of the driver interface system 16. The driver interface system 16 includes a steering mechanism 18 coupled with a plurality of sensors 20 and a friction device 22. The sensors 20 and the friction device 22 are electrically connected with the controller 14, as illustrated.

In the illustrated embodiment, the steering mechanism 18 includes a steering wheel 24 fixedly coupled to a steering wheel shaft 26. The rotatable steering mechanism 18 provides driver commands to the steer-by-wire system 10 as a function of an angular position ($\theta$) of the steering wheel 24 and/or the steering wheel shaft 26. In an alternative embodiment, movement of the steering mechanism 18 and the corresponding position information may be other than rotational.

The angular position ($\theta$) may be used in the steer-by-wire system 10 in a manner similar to the performance of conventional mechanical linkage type vehicle steering systems. The angular position ($\theta$) may be translated by the steer-by-wire system 10 to a corresponding position of the devices used to maneuver the vehicle. An exemplary embodiment is a vehicle that includes a road wheel in which the angular position ($\theta$) of the steering wheel 24 is translated by the steer-by-wire system 10 to the turning angle of the road wheel. The angular position ($\theta$) of the steering wheel 24 may be sensed by the controller 14 using the sensors 20.

The sensors 20 may be one or more devices capable of providing an output to the controller 14 indicative of the status of one or more control interface devices. The output may be an electrical signal, a wireless signal or any other form of output capable of receipt by the controller 14. In the embodiment illustrated in FIG. 2, the sensors 20 include a steering mechanism position sensor 28 and a torque sensor 30.

The steering mechanism position sensor 28 may be a rotary encoder, a contacting device, a non-contacting device, a Hall effect device, a magnetic device or any other type of position sensor(s) operable to sense the position of the steering mechanism 18. The steering mechanism position sensor 28 may be positioned such that rotation of the steering wheel 24 or the steering wheel shaft 26 may be measured. The measurement may be provided as an output to the controller 14. The output may be indicative of an angular position ($\theta$) of the steering mechanism 18. In alternative embodiments, the steering mechanism position sensor 28 may provide any other measurement parameter indicative of positional measurement of the steering mechanism 18.

The torque sensor 30 may be a magneto resistive device, a compliant optical device, a contacting device or any other type of sensor(s) capable of measuring a range of torque and providing a corresponding output. The output may be a digital signal, an analog signal or any other signal compatible with the controller 14. In one embodiment, the torque sensor 30 includes at least two angle of rotation sensors to indicate the elastic torsion of the steering wheel shaft 26. The torque sensor 30 may be positioned along the steering wheel shaft 26 to sense a magnitude of torque applied to the steering wheel 24 by the operator.

The torque applied by the operator is determined as a function of a counter-torque applied by the friction device 22. The friction device 22 may be any device operable to apply varying amounts of counter-torque on the steering mechanism 18. Examples of such devices include, for example, a motor, magneto reological brakes or any other device capable of supplying a variable resistance. The friction device 22 of one embodiment may include a rotatable part (not shown) and a fixed part (not shown). The rotatable part may be fixedly coupled with steering wheel shaft 26. The friction device 22 may apply a rotational counter-torque to the rotating part in opposition, or resistance, to the torque applied to the steering mechanism 18 by the operator. The application of the counter-torque by the friction device 22 may be varied to provide a "road feel" to the operator.

Referring now to FIGS. 1 and 2, operation of the previously discussed embodiments of the steer-by-wire system 10 will be discussed in the exemplary embodiment of a vehicle that includes a road wheel. In this example, an operator desiring to maneuver the vehicle may apply torque to the steering wheel 28 thereby causing rotation from a first angular position ($\theta_1$) to a second angular position ($\theta_2$). The steering mechanism position sensor 28 provides the angular position ($\theta$) of the steering mechanism 18 to the controller 14 as the steering wheel 24 is rotated. Simultaneously, the controller 14 monitors the torque sensor 30 and other operating parameters, such as, for example, vehicle speed, and provides electrical signals to the friction device 22. The electrical signals direct the friction device 22 to supply sufficient counter-torque to provide "road feel" to the steering wheel 24.

The controller 14 translates the changing angular position ($\theta$) of the steering wheel 24 to electrical signals that are output to the steering actuation system 12. The electrical signals are translated by the steering actuation system 12 to position at least one device used to maneuver the vehicle. In this example embodiment, the position is the turning angle of the road wheel. As such, as the controller 14 may provide a continuously changing electrical signal corresponding to the angular position ($\theta$) of the steering wheel 24. The turning angle of the road wheel is correspondingly adjusted by the steering actuation system 12.

The operation of the previously discussed exemplary embodiments describes the functionality of the steer-by-wire system 10 in the absence of abnormal operating conditions or other failures within the system. The steer-by-wire system 10 may also include failure condition detection and alternate operating modes when a failure is detected. It should be realized that many techniques for failure monitoring and corresponding failure modes may be used.

One embodiment of the steer-by-wire system 10 includes a failure mode referred to as a torque steer mode. The controller 14 initiates the torque steer mode following determination that one of three failure mode scenarios is occurring within the driver interface system 16. The three scenarios may be generally described as:

First Scenario—The steering mechanism 18 is locked in position;

Second Scenario—Movement of the steering mechanism 18 by the operator is difficult or otherwise impaired; and Third Scenario—The steering mechanism position sensor 28 has malfunctioned.

The three scenarios describe failures within the driver interface system 16 that render the steering mechanism 18 non-responsive to driver commands.

The determination that one or more of the above three scenarios is occurring may be based on operating conditions. Determination may be a function of, for example, predetermined threshold values, deviation from historical operational data or inconsistency in the operating conditions. The operating conditions may be determined as a function of the operating parameters. The controller 14, or some other device capable of logic processing, may use the operating parameters to determine that a failure within the driver interface system 16 is occurring. In addition, other devices such as, for example, intelligent sensors, relays or other indicators of operating parameters and/or operating conditions within the vehicle and the steer-by-wire system 10 may provide failure indications. Accordingly, many different combinations of devices, operating parameters and logic may be used to ascertain operating conditions resulting in the conclusion that one of the above three scenarios is occurring and entry into the torque steer mode is warranted.

Upon entry into the torque steer mode, the controller 14 may enable the friction device 22 to generate a predetermined amount of counter-torque. The predetermined amount of counter-torque is applied to the steering mechanism 18 as a resistive force when the operator applies torque to the steering mechanism 18. In one embodiment, the predetermined counter-torque allows some movement of the steering mechanism 18 by the operator.

Alternatively, the predetermined amount of counter-torque prohibits the operator from moving the steering mechanism 18. The friction device 22 may lock, or otherwise freeze the position of the steering mechanism 18 using any of a number of different techniques. In one embodiment, the friction device 22 applies sufficient counter-torque to disallow any movement of the steering mechanism 18 in either direction. In this embodiment, the friction device 22 has operating capabilities similar to a magnetic clutch. In the second embodiment, the rotating part of the friction device 22 is magnetically coupled to the fixed part of the friction device 22 to prevent rotation of the steering mechanism 18.

In a third embodiment, the fixed part of the friction device 22 includes at least one latching device such as, for example, a pin, a lug or other similar engagement mechanism. The latching device is actuated to prevent further rotation by fixedly coupling the rotating part and the fixed part. The friction device 22 of a fourth embodiment includes a wedge that, upon actuation, inserts between the fixed part and the rotating part, preventing further rotation of the rotating part.

The controller 14 of one embodiment of the steer-by-wire system 10 may selectively apply a predetermined torque that allows limited movement or locks the steering mechanism 18 in place. Selection by the controller 14 may be a function of the scenario and the operating conditions. When operating conditions indicate the First or Second Scenario is occurring, the controller 14 may select to lock the steering mechanism 18 in place. Alternatively, when the Second Scenario is indicated, the controller 14 may apply a predetermined counter-torque that allows limited movement of the steering mechanism 18. When the Third Scenario is indicated, the controller 14 may choose to lock the steering mechanism 18 or apply a predetermined counter-torque to allow limited movement.

During the torque steer mode, the torque sensor 30 provides redundancy, or backup, for the steering mechanism position sensor 28. Measurement by the steering mechanism position sensor 28 is not used to indicate the operators intent in either the First, Second or Third Scenario. Instead, the torque sensor 30 is monitored to ascertain the operators intentions with regard to steering the vehicle.

When the operator attempts to maneuver the vehicle by re-positioning the steering mechanism 18, torque is placed on the steering mechanism 18. Since a counter-torque is placed on the steering mechanism 18 by the friction device 22, the controller 14 may use the torque sensor 30 to sense the magnitude of the torque applied by the operator. The magnitude of the torque may correspond to the degree of re-positioning the operator intended for the steering mechanism 18. Accordingly, measurements of the torque sensor 30 during the torque steer mode are indicative of driver commands and are used to establish the intent of the operator.

In one embodiment, the controller 14 receives the output from the torque sensor 30 and develops an estimated angular position ($\theta_{est}$) for the steering mechanism 18. The estimated angular position ($\theta_{est}$) may be determined as a function of the torque applied by the operator and the counter-torque applied by the friction device. The dynamic relationship between the angular position ($\theta$) of the steering mechanism 18 and the applied torque may be represent by:

$$I\ddot{\theta} = T_{dr} - T_{mr} \qquad \text{Equation 1}$$

where I represents the inertial moment and θ represents the angular acceleration of the steering mechanism 18. In addition, $T_{dr}$ represents the magnitude of the torque applied by the operator on the steering mechanism 18 and $T_{mr}$ represents the magnitude of the counter-torque applied by the friction device 22.

Equation 1 may be rewritten as:

$$I\ddot{\theta} = T_{dr} - \mu_{mr}\dot{\theta} \qquad \text{Equation 2}$$

where $\mu_{mr}$ represents a friction coefficient used by the friction device 22 to generate the counter-torque and $\dot{\theta}$ represents an angular speed of the steering mechanism 18. Since a predetermined counter-torque is generated by the friction device 22 during the torque steer mode, the friction coefficient ($\mu_{mr}$) may be set to a predetermined value. Where the predetermined counter-torque allows little or no movement of the steering mechanism 18 the inertial moment (I) in Equation 2 may be made negligible resulting in:

$$T_{dr} - \mu_{mr}\dot{\theta} = 0. \qquad \text{Equation 3}$$

Equation 3 may be further rewritten as:

$$T_{dr} = \mu_{mr}\dot{\theta} \qquad \text{Equation 4}$$

to provide a relationship between the torque applied by the operator on the steering mechanism 18 and the angular speed ($\dot{\theta}$) of the steering mechanism 18.

Using the relationship developed in Equation 4, the estimated angular position ($\theta_{est}$) for a period of time may be determined by:

$$\theta_{est} = \int_{t_0}^{t} \frac{T_{dr}}{\mu_{mr}} dt + \theta_{t_0}. \qquad \text{Equation 5}$$

Where $$\int_{t_0}^{t} \frac{T_{dr}}{\mu_{mr}} dt$$

represents the change in torque during the period from time ($t_0$) to time (t); and $\theta_{t_0}$ represents an initial angular position of the steering mechanism 18 at time ($t_0$). The value for time (t) may be, for example, a function of the processing speed of the controller 14, the desired sample period or any other value to optimize accuracy and performance during the torque steer mode.

The initial angular position ($\theta_{t_0}$) is set to a value representing the angular position (θ) of the steering mechanism 18 measured at the time the controller 14 initiated the torque steer mode. Alternatively, the value for the initial angular position ($\theta_{t_0}$) is set to the last valid measurement of the angular position (θ) by the steering mechanism position sensor 28, an assumed center or straight position or another angular position. Validity of the measured value by the steering mechanism position sensor 28 may be determined by the controller 14 as a function of the previously discussed operating conditions.

At the conclusion of one time period (t), the value for the initial angular position ($\theta_{t_0}$) may be set to the estimated angular position ($\theta_{est}$) for for the next period from time ($t_0$) to time (t). As such, during the torque steer mode, the controller 14 calculates estimated values for the angular position (θ) of the steering mechanism 18 without regard to the actual angular position (θ) of the steering mechanism 18. The estimated value may be updated, or adjusted, on a regular basis as a function of the torque applied by the operator. Based on each of the estimated angular positions ($\theta_{est}$) calculated, the controller 14 outputs corresponding electrical signals to control the steering actuation system 12.

In another embodiment, the predetermined counter-torque may allow movement of the steering mechanism 18 such that the inertial moment (I) may be considered. As such, the inertial moment (I) in Equation 2 may be included in determination of the estimated angular position ($\theta_{est}$). Revision of Equation 5 to include the inertial moment (I) results in:

$$\theta_{est} = (1 - e^{\frac{\mu_{mr}}{I}(t-t_0)})I \int_{t_0}^{t} \frac{T_{dr}}{\mu_{mr}} dt + \theta_{t_0}. \qquad \text{Equation 6}$$

Figure 3:
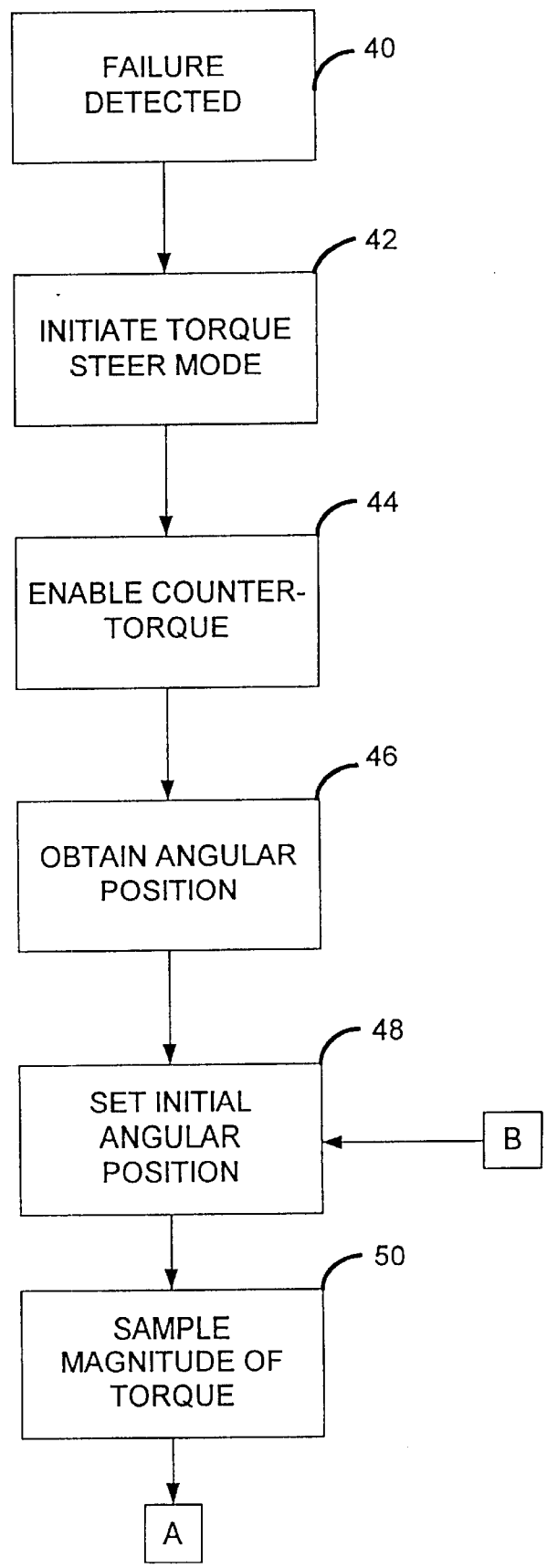
FIG. 3 is a first part of a flow diagram illustrating operation of the steer-by-wire system illustrated in FIG. 1.

FIG. 3 is a flow diagram depicting operation of the steer-by-wire system 10 during the torque steer mode with reference to the previously discussed embodiments of FIGS. 1 and 2. The operation begins at block 40 where a failure within the driver interface system 16 is detected as a function of operating parameters. At block 42 the torque steer mode is initiated. The friction device 22 is enabled to apply a predetermined counter-torque to the steering mechanism 18 at block 44. At block 46, the measured angular position (θ) is obtained from the steering mechanism position sensor 28. The initial angular position ($\theta_{t_0}$) for the period from time ($t_0$) to time (t) is set to the angular position (θ) at block 48. At block 50, the magnitude of the torque applied by the operator to the steering mechanism 18 during the period from time ($t_0$) to time (t) is sampled.

Figure 4:
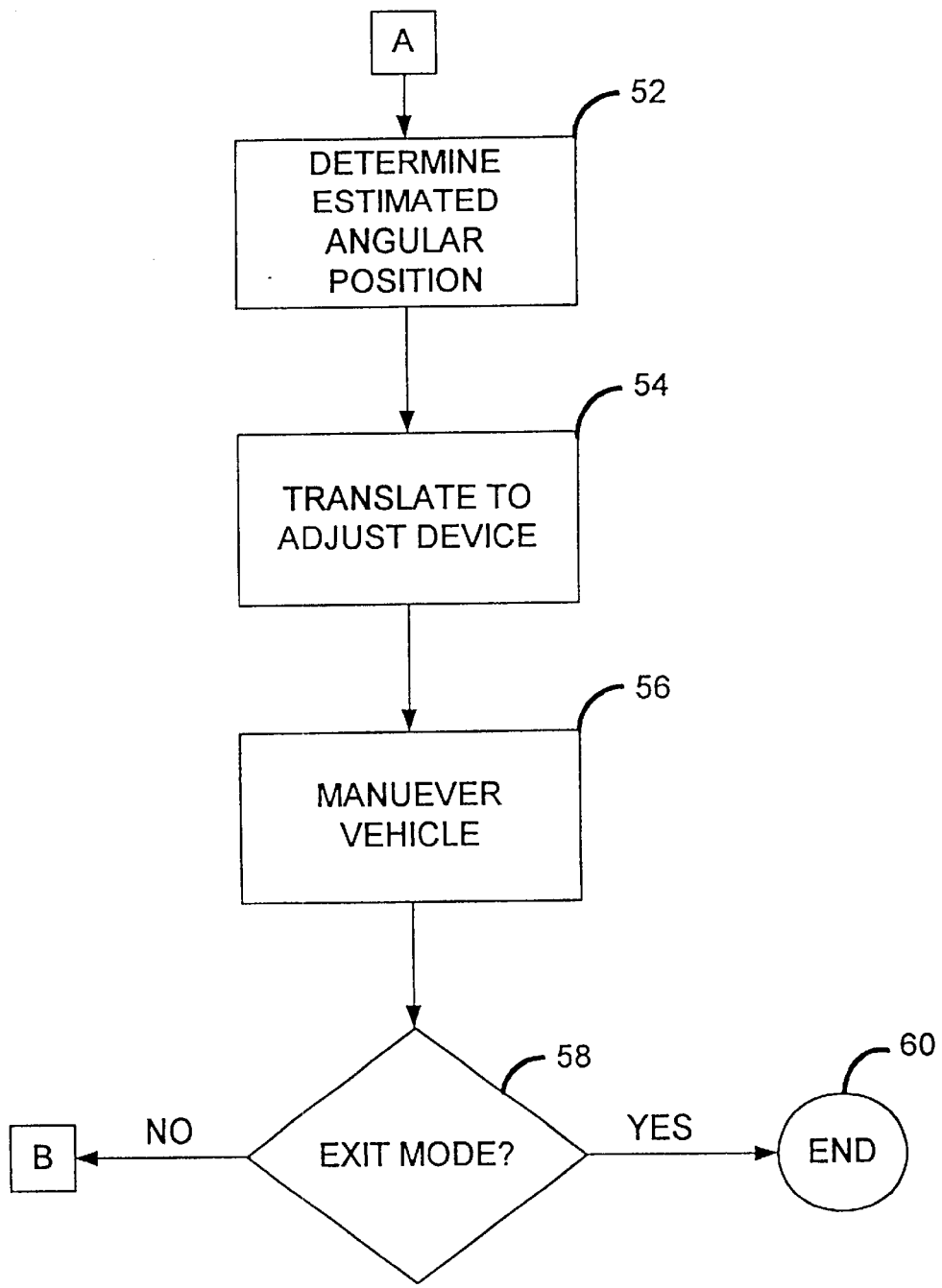
FIG. 4 is a second part of the flow diagram of FIG. 3.

Referring now to FIG. 4, the estimated angular position ($\theta_{est}$) is determined using Equation 5 at block 52. At block 54, the estimated angular position ($\theta_{est}$) is translated to a corresponding adjustment of the device(s) used to maneuver the vehicle. The device(s) are re-positioned or otherwise adjusted to maneuvering the vehicle at block 56. At block 58, a determination is made whether the steer-by-wire system 10 should remain in the torque steer mode. If not, the mode ends at block 60. If yes, the mode returns to block 48 where the initial angular position ($\theta_{t_0}$) for the next period from time ($t_0$) to time (t) is set to the previously calculated estimated angular position ($\theta_{est}$) The operation of the torque steer mode continues to repeat until the mode ends at block 60.

The previously discussed embodiments of the steer-by-wire system 10 allow the use of the torque sensor 30 as a redundancy, or backup of the steering mechanism position sensor 28. During the torque steer mode, the controller 14 uses the relationship between the torque on the steering mechanism 18 and the steering angle rate ($\dot{\theta}$) to provide an estimation of the angular position (θ) of the steering mechanism 18. The estimation represents the intent of the driver to manuever the vehicle.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents that are intended to define the scope of this invention.

What is claimed is:

1. A method of operating a steer-by-wire system in a vehicle, the method comprising:

a) detecting failure within a driver interface system;

b) sensing a torque applied by a driver of the vehicle to a steering mechanism after detection of the failure; and c) maneuvering the vehicle as a function of the torque sensed after the failure.

2. The method of claim 1, wherein b) comprises translating the torque to movement of the steering mechanism.

3. The method of claim 1, further comprising d) controlling movement of the steering mechanism.

4. The method of claim 3, wherein d) comprises controlling operation of a friction device.

5. The method of claim 1, wherein c) comprises:

setting a value for the position of the steering mechanism;

adjusting the value as a function of the torque; and maneuvering as a function of the adjusted value.

6. The method of claim 1, wherein a) comprises detecting a locked steering mechanism condition.

7. The method of claim 1, wherein a) comprises detecting that movement of the steering mechanism is impaired.

8. The method of claim 1, wherein a) comprises detecting the malfunction of a steering mechanism position sensor.

9. A method of maneuvering a vehicle using a steer-by-wire system when a steering mechanism within the steer-by-wire system is non-responsive to driver commands, the method comprising:

a) restricting movement of the steering mechanism;

b) sensing torque applied to the steering mechanism that is indicative of driver commands; and c) controlling the trajectory of the vehicle as a function of the torque.

10. The method of claim 9, wherein c) comprises:

setting an initial angular position of the steering mechanism;

calculating an estimated angular position as a function of the torque; and adjusting the trajectory as a function of the estimated angular position.

11. The method of claim 9, wherein b) comprises converting a magnitude of rotational torque to an angular position of the steering mechanism.

12. The method of claim 9, wherein a) comprises generating counter-torque with a friction device.

13. The method of claim 9, further comprising the act of initiating a torque steer mode.

14. The method of claim 9, wherein b) comprises sampling an output from a torque sensor during a time period.

15. The method of claim 9, wherein c) further comprises adjusting the turning angle of a road wheel.

16. A method of maneuvering a vehicle using a steer-by-wire system, the method comprising:

a) detecting a failure within a driver interface system of the steer-by-wire system;

b) initiating a torque steer mode in response to the failure;

c) enabling a counter-torque to restrict movement of a steering mechanism;

d) measuring a torque applied to the steering mechanism by a driver of the vehicle;

e) calculating an estimated position of the steering mechanism as a function of the torque; and f) adjusting an angular position of a road wheel as a function of the estimated position.

17. The method of claim 16, wherein d), e) and f) are repeated until the torque steer mode ends.

18. The method of claim 16, wherein b) comprises obtaining a position of the steering mechanism.

19. The method of claim 16, wherein a) comprises analyzing operating conditions to determine that one of a plurality of failures is occurring.

20. A steer-by-wire system for steering a vehicle, the steer-by-wire system comprising:

a driver interface system comprising a steering mechanism and a torque sensor coupled to the steering mechanism; and a controller electrically connected with the driver interface system, the controller operable to detect failure conditions within the driver interface system, the controller operable to steer the vehicle during failure conditions as a function of torque measurable by the torque sensor.

21. The steer-by-wire system of claim 20, wherein the driver interface system further comprises a steering mechanism position sensor and a friction device coupled to the steering mechanism.

22. The steer-by-wire system of claim 21, wherein the friction device is electrically connected with the controller and is operable to control movement of the steering mechanism as directed by the controller.

23. The steer-by-wire system of claim 20, further comprising a steering actuation system electrically connected with the controller.

24. The steer-by-wire system of claim 23, further comprising a road wheel coupled with the steering actuation system, wherein a turning angle of the road wheel is adjustable by the steering actuation system.

25. The steer-by-wire system of claim 24, wherein the turning angle is adjustable as a function of the torque.

26. The steer-by-wire system of claim 20, wherein the torque sensor is operable to measure torque applied to the steering mechanism by an operator of the vehicle.

27. The steer-by-wire system of claim 20, wherein the failure conditions are detectable as a function of operating conditions.

28. The steer-by-wire system of claim 27, wherein the operating conditions are indicative of faulty operation of the steering mechanism.

29. The steer-by-wire system of claim 28, wherein the operating conditions are indicative of operational failure of a steering mechanism position sensor.

* * * * *